US 6,549,787 B1

(12) United States Patent
Ravi

(10) Patent No.: US 6,549,787 B1
(45) Date of Patent: *Apr. 15, 2003

(54) SYSTEM AND METHOD FOR USE IN AN MSC-BS INTERFACE FOR SUPPORTING AN ACCESS STATE HANDOFF

(75) Inventor: Shobha C. Ravi, Richardson, TX (US)

(73) Assignee: Samsung Electronics Co., Ltd., Suwon (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,471

(22) Filed: Apr. 26, 1999

(51) Int. Cl.[7] ................................................ H04B 7/00
(52) U.S. Cl. ........................ 455/525; 455/435; 455/524; 455/436
(58) Field of Search .............................. 455/442, 510, 455/514, 560, 450, 524, 453, 434, 436, 435, 525; 370/331, 332, 335

(56) References Cited

U.S. PATENT DOCUMENTS

| | | | | |
|---|---|---|---|---|
| 5,590,177 A | * | 12/1996 | Vilmur et al. | 455/436 |
| 5,649,286 A | * | 7/1997 | Frerking | 455/435 |
| 5,697,055 A | * | 12/1997 | Gilhousen et al. | 455/436 |
| 5,920,550 A | * | 7/1999 | Willey | 370/332 |
| 6,021,122 A | * | 2/2000 | Tiedemann, Jr. | 370/331 |
| 6,038,449 A | * | 3/2000 | Corriveau et al. | 455/439 |
| 6,081,714 A | * | 6/2000 | Wakizaka | 455/437 |
| 6,108,547 A | * | 8/2000 | Yamashita et al. | 455/442 |
| 6,167,274 A | * | 12/2000 | Smith | 455/456 |
| 6,178,164 B1 | * | 1/2001 | Wang et al. | 370/331 |

FOREIGN PATENT DOCUMENTS

| | | |
|---|---|---|
| EP | 0 782 366 | 7/1997 |
| GB | 2 211 699 | 7/1989 |

* cited by examiner

*Primary Examiner*—Nay Maung
*Assistant Examiner*—Sonny Trinh

(57) ABSTRACT

There is disclosed, for use in a wireless network comprising a plurality of base stations communicating with mobile devices, an apparatus for establishing a call connection between a mobile device and one of the base stations (BS). The apparatus comprises a message control processor that receives from one or more base stations cell information messages transmitted by the mobile station. Each cell information message contains cell ID data identifying the base station(s) from which the mobile station is receiving wireless messages. If the message control processor receives a first cell information message from a first BS and subsequently receives a second cell information message from a second BS, the message control processor continues to process only the first cell information message if the cell ID data in the second cell information message is the same as the cell ID data in the first cell information message. However, if the cell ID data in the second cell information message is different than the cell ID data in the first cell information message, the message control processor aborts processing of the first cell information message and begins processing the second cell information message.

20 Claims, 11 Drawing Sheets

SYSTEM AND METHOD FOR USE IN AN MSC-BS INTERFACE FOR SUPPORTING AN ACCESS STATE HANDOFF

TECHNICAL FIELD OF THE INVENTION

The present invention is directed, in general, to wireless networks and, more specifically, to a system for performing a handoff between base stations of a mobile station that is in the process of accessing the wireless network.

BACKGROUND OF THE INVENTION

Wireless subscribers use a wide variety of wireless devices, including cellular phones, personal communication services (PCS) devices, and wireless modem-equipped personal computer (PCs), among others. The large number of subscribers and the many applications for wireless communications have created a heavy subscriber demand for RF bandwidth. To maximize usage of the available bandwidth, a number of multiple access technologies have been implemented to allow more than one subscriber to communicate simultaneously with each base station (BS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

As is well known, CDMA systems divide the RF spectrum into a number of wideband digital radio signals. Each digital radio signal carries several different coded "channels". Each coded channel is distinguished by a unique pseudo-random noise (PN) code used by the mobile station and/or the base station. In a CDMA receiver, the coded channels are decoded by a signal correlator that matches PN sequences. Some coded channels are used as data traffic channels to transport subscriber voice and/or data signals, while other coded channels are used as control channels, including pilot, synchronization, paging and access channels.

When a mobile station accesses a base station in a CDMA wireless network, the CDMA control channel (which has one unique PN code) assigns the mobile station to a data traffic channel (which has a different PN code) on which the mobile station exchanges data traffic with another party, a data terminal, a fax machine, or the like. Typically, the coded control channel and the data traffic channel(s) used by the mobile station and the base station are on the same RF carrier frequency. Advantageously, in many CDMA networks, the control channels and the data traffic channels are on the same RF carrier frequency in all cells (i.e., base station coverage areas) in the networks.

Because adjoining base stations in a CDMA wireless network may operate on the same RF carrier frequency, a mobile station can simultaneously access two or more base stations by using the same PN codes to communicate in data traffic channels and control channels with each base station. This enables a process know as "soft handoff" to occur when a mobile station communicating with a first base station enters a second base station's cell site. A soft handoff may occur while a mobile station is actively communicating with another device (e.g., a voice phone call). A soft handoff also may occur when the mobile station is turned "ON" and has accessed the CDMA network, but is not actively communicating with another device. This is known as an "idle" handoff.

Field data on CDMA wireless networks have shown a high percentage of call drops experienced by mobile stations in the system access state. In a CDMA wireless network, call setup failures frequently occur due to very quick propagation environment changes, such as when a mobile station moves behind a hill or a large building. This can cause problems when the mobile station is in the middle of a system access operation. In older systems, when a mobile station sends an Origination message to a first base station or receives a Page message from that first base station, the mobile station enters a "system access" state during which the mobile station cannot undergo a handoff to a second base station. If the RF propagation environment changes quickly enough, the mobile station may not receive a channel assignment message from the first base station and the data traffic channel will not be established. More recently, technological solutions to this problem have been proposed in the CDMA air interface by providing mobile stations with the ability to perform soft handoff operations during system access states with cell sites having strong pilot signals.

However, when a mobile station enters a system access state and attempts to access the CDMA wireless network through more than one base station (BS), a related problem arises in the interface between the bases stations and the mobile switching center (MSC). To initiate a system access, a mobile station sends an Origination message to a base station, which responds with BS Acknowledgment Order message. However, due to the quick changes in the RF propagation environment described above, the mobile station may not receive the BS Acknowledgment Order message. The mobile station may then send an Origination message to another base station. As a result, the mobile station may send Origination messages to several base stations, each of which in turn sends a CM Service Request (CMSR) message to the mobile switching center.

Unfortunately, the MSC has no way of knowing with which base station the mobile stations is currently in communication, or is the mobile station has been or is being handed-off from a first base station to a second base station during the access probe operation. Currently there are two approaches proposed to support access probe handoff over the MSC-BS interface.

One approach requires the MSC to respond to all the CMSR messages it receives via different base stations from a single mobile station for the same call. Thus, the;MSC sends multiple Assignment Request messages to assign multiple resources to set up one call. This results in wasted/idle network resources, dropped calls, and potential reduction in capacity. Network resources are wasted or idle because only one of the assigned resources ultimately is used to establish the call, while the others are not used. Calls may be dropped because the multiple resources setup in the public switched telephone network (PSTN) for the same call may result in network errors.

The second approach requires the MSC to respond to the first CMSR message it receives and to ignore the rest. Since the MSC responds only to the first CMSR message, there is a significant chance for the call to be dropped. The MSC will likely receive the first CMSR message from the first base station the mobile station attempts to access. By the time the base station receives the Assignment Request message from the MSC, the mobile station may have moved out of the first base station's coverage area and the call will be dropped.

There is therefore a need in the art for improved CDMA wireless network systems that are less likely to drop calls from a mobile station during access probe handoff operations. In particular there is a need for an improved BS-MSC interface that uses less network resources to handle an access probe handoff operation and transmits fewer call set-up messages across the wired backbone between the base stations and the mobile switching center of a wireless network.

SUMMARY OF THE INVENTION

The present invention discloses systems and methods that support access probe handoff over the interface between the mobile switching center (MSC) and the base station (BS). The disclosed procedure allows for efficient use of the signaling link between the MSC and the base stations by minimizing the number of signaling messages required to successfully perform an access probe handoff. The disclosed procedure also increases the reliability of the access probe handoff.

To address the above-discussed deficiencies of the prior art, it is a primary object of the present invention to provide, for use in a wireless network comprising a plurality of base stations capable of communicating with a plurality of mobile devices, an apparatus for establishing a call connection between a first one of the plurality of mobile devices and one of the plurality of base stations. The apparatus comprises a message control processor capable of receiving from the plurality of base stations cell information messages generated by the first mobile station, each of the cell information messages comprising cell identification (ID) data identifying ones of the plurality of base stations from which the first mobile station is receiving wireless messages. The message control processor, in response to receipt of a first cell information message from a first base station and receipt of a subsequent second cell information message from a second base station, processes only one of the first and second cell information messages and transmits to only one of the first and second base stations a resource allocation message capable of establishing the call connection with the first mobile station.

The "cell information messages" may be Paging Response messages or CM Service Request messages transmitted by a mobile station (via one or more base stations) to the mobile switching center (MSC). The "resource allocation message" may be an Assignment Request message sent from the MSC to a base station allocating radio resources in the base station to communicate with the mobile station.

According to an advantageous embodiment of the present invention, the apparatus is disposed in a mobile switching center (MSC) of the wireless network. This central location allow the message control processor to operate in an efficient manner. However, it is not absolutely required that the apparatus be disposed in the MSC. In alternate embodiments of the present invention, the message control processor may be a stand-alone device that communicates with the base stations and the MSC, or the message control processor may be disposed in one of the base stations. Situating the message control processor outside of the MSC requires additional message transfers over the wired backbone of the wireless network that are not required when the message control processor is disposed in the MSC.

According to one embodiment of the present invention, the message control processor compares first cell ID data of the first cell information message and second cell ID data of the second cell information message, and, if the second cell ID data is the same as the first cell ID data, the message control processor processes the first cell information message and transmits the resource allocation message to the first base station.

According to another embodiment of the present invention, the message control processor compares first cell ID data of the first cell information message and second cell ID data of the second cell information message, and, if the second cell ID data is different than the first cell ID data, the message control processor processes the second cell information message and transmits the resource allocation message to the second base station.

According to yet another embodiment of the present invention, the apparatus further comprises a timer associated with the message control processor capable of measuring a time period, T, after receipt of the first cell information message, wherein the message control processor processes only the first cell information messages and transmits the resource allocation message only to the first base station if the second cell information message is received after the time period, T, expires.

According to still another embodiment of the present invention, the message control processor compares first cell ID data of the first cell information message and second cell ID data of the second cell information message, and, if the second cell ID data is the same as the first cell ID data, the message control processor continues processing the first cell information message and ignores the second cell information message.

According to a further embodiment of the present invention, the message control processor compares first cell ID data of the first cell information message and second cell ID data of the second cell information message, and, if the second cell ID data is different than the first cell ID data, the message control processor stops processing the first cell information message and begins processing the second cell information message.

The present invention has performance advantages over the previous approaches. Since the MSC sends only one Assignment Request message, only one set of network resources are assigned for each call made by any given mobile station. Additionally, the disclosed procedure also allows resources to be assigned in a base station that has a comparatively high probability of successfully communicating with the mobile station.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 11, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged CDMA wireless network.

Figure 1:
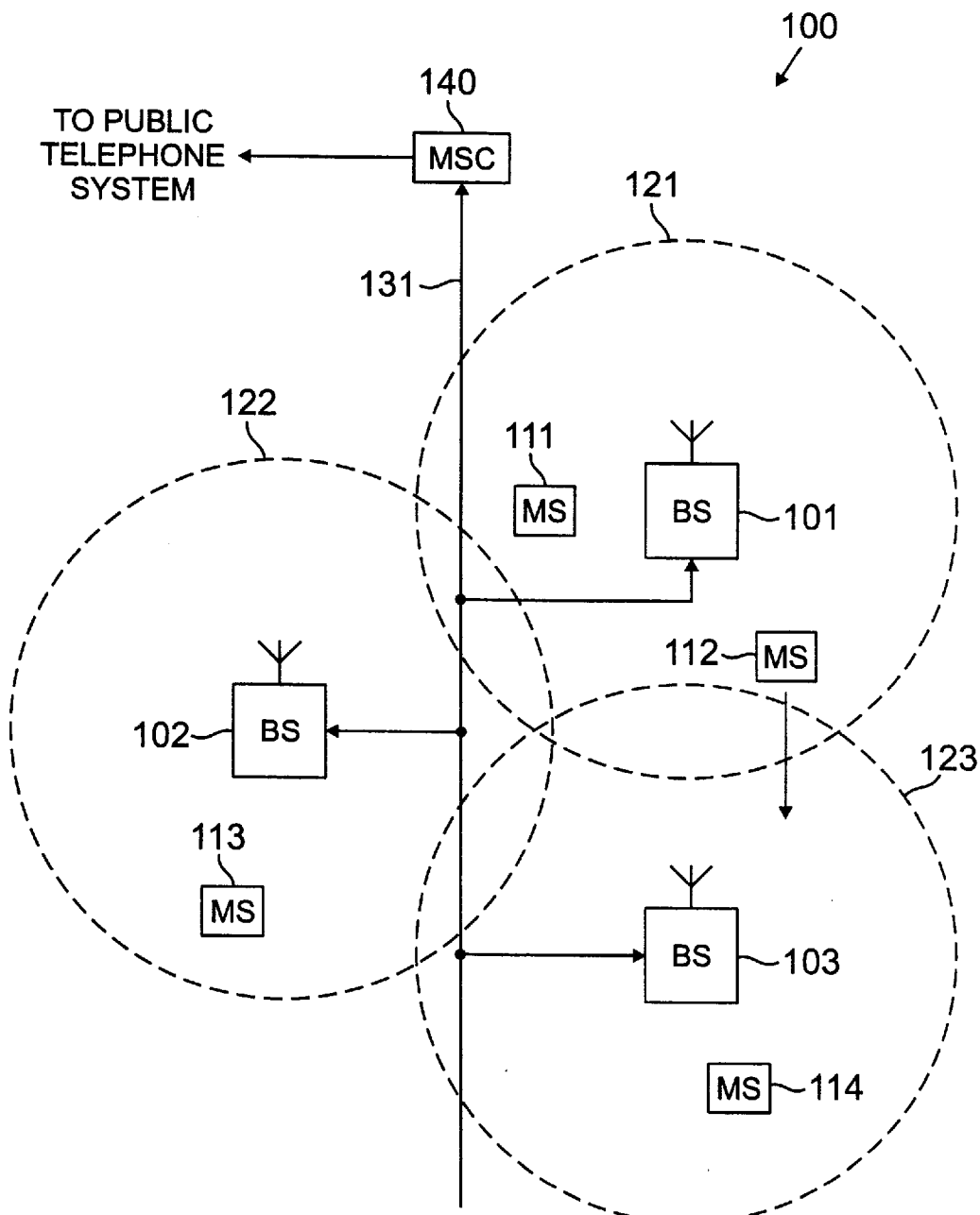
FIG. 1 illustrates an exemplary CDMA wireless network according to one embodiment of the present invention.

FIG. 1 illustrates exemplary wireless network 100 according to one embodiment of the present invention. Wireless network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Communications line 131 may be any suitable connection means, including a T1 line, a T3 line, a fiber optic link, a network backbone connection, and the like. Mobile switching center 140 is well known to those skilled in the art. Mobile switching center 140 is a switching device that provides services and coordination between the subscribers in a wireless network and external networks, such as the public telephone system. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101, MS 113 is located in cell site 122 and is in communication with BS 102, and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well know, the "handoff" procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

A mobile station enters an access state by transmitting an Origination message to a base station or by receiving a Page message from a base station. In conventional wireless systems, a base station that receives an Origination message sends a BS Acknowledgment Order message to the mobile station and also sends a CM Service Request message to the mobile switching center. The mobile switching center then sends an Assignment Request message to the base station in order to allocate base station resources to the mobile station.

However, if the mobile base is moving rapidly between base stations or if high levels of radio interference occur, the mobile station may not receive the BS Acknowledgment Order message from the base station and may transmit another Origination message to a second base station. This will cause the second base station to send a BS Acknowledgment Order message to the mobile station and also to send a CM Service. Request message to the mobile switching center. The mobile switching center then sends an Assignment Request message to the second base station in order to allocate base station resources to the mobile station.

This process may be repeated with other base stations if the mobile station does not receive the BS Acknowledgment Order message from the second base station or other subsequent base station(s). As a result, redundant system resources are allocated to the same mobile station and unnecessary command messages are transmitted between the mobile switching center and the base stations.

Furthermore, a similar phenomenon may occur if a mobile station receives a Page message from a base station. In conventional wireless systems, a mobile station that receives a Page message sends a Page Response message to the base station. The base station responds by sending a BS Acknowledgment Order message to the mobile station and also by sending a Paging Response message to the mobile switching center. The mobile switching center then sends an Assignment Request message to the base station in order to allocate base station resources to the mobile station. However, if the base station is moving rapidly between base stations or if high levels of radio interference occur, the mobile station may not receive the BS Acknowledgment Order message from the base station and may transmit another Paging Response message to a second base station. This will trigger a process that will allocate resources in the second base station to the mobile station. Again, redundant system resources are allocated to the same mobile station and unnecessary command messages are transmitted between the mobile switching center and the base stations.

The present invention discloses systems and procedures, for use in association with a mobile switching center, that support an access probe handoff over the interface between the mobile switching center (MSC) and the base station (BS) and that efficiently use the signaling link between the MSC and the base stations. The present invention minimizes the number of signaling messages required to successfully perform an access probe handoff and increases the reliability of the access probe handoff.

Figure 2:
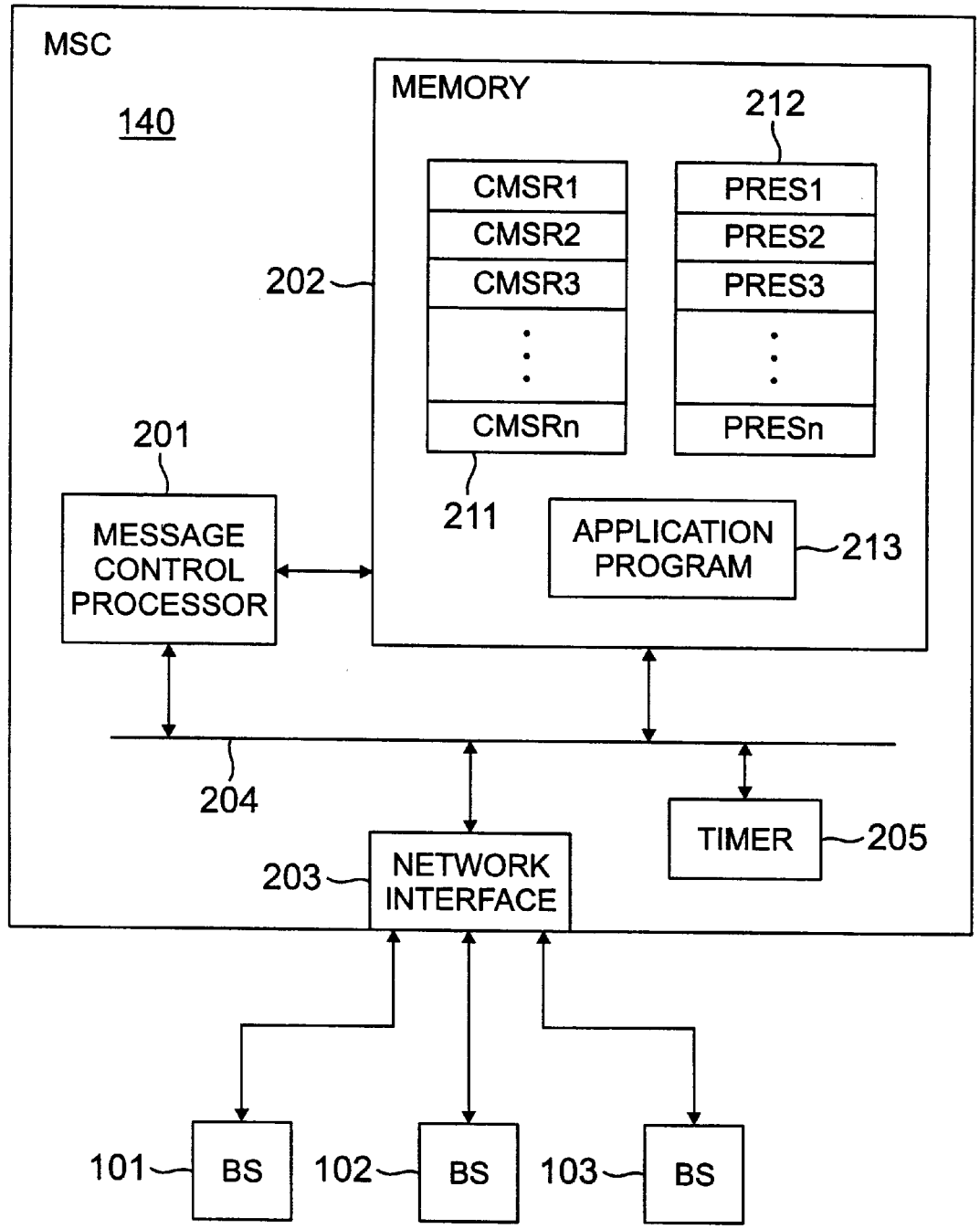
FIG. 2 illustrates in greater detail the exemplary mobile switching center in the exemplary wireless network in FIG. 1 according to one embodiment of the present invention.

FIG. 2 illustrates in greater detail exemplary mobile switching center (MSC) 140 in wireless network 100 according to one embodiment of the present invention. MSC 140 comprises message control processor 201, memory 202 and network interface 203. Message control processor 201, memory 202 and network interface 203 communicate via a local data bus 204. MSC 140 further comprises timer 205, described below in greater detail.

Incoming system messages, such as Origination messages, Page Response messages, and the like, are received from BS 101, BS 102, BS 103, and other base stations in wireless network 100 via network interface 203 and are stored in memory 202 and processed by message control processor 201. Outgoing system messages, such as Page messages, Assignment Request messages, and the like, are generated by message control processor 201 and transmitted to BS 101, BS 102, BS 103, and other base stations (not shown) in wireless network 100 via network interface 203.

Memory 202 contains CM Service Request table 211, Page Response table 212, and application program 213. CM Service Request table 211 stores a plurality of CM Service Request messages, labeled CMSR1, CMSR2, CMSR3, . . . , CMSRn, received from BS 101, BS 102, BS 103, and other base stations in wireless network 100 in response to Origination messages received from the same mobile station. Thus, CMSR1, CMSR2, CMSR3, . . . , CMSRn are all associated with the same mobile station. CM Service Request table 211 also may store other CM Service Request messages (not shown) received from BS 101, BS 102, BS 103, etc. in response to Origination messages received from other mobile stations. However, it is sufficient for the purposes of this disclosure to explain the operation of MSC 140 with respect to only one mobile station. For the purposes of clarity and brevity in explaining the operation of MSC 140, these other CM Service Request messages are not shown or further described in order to avoid redundant description.

Page Response table 212 stores a plurality of Page Response messages, labeled PRES1, PRES2, PRES3, . . . , PRESn, transferred to MSC 140 by BS 101, BS 102, BS 103, and other base stations in wireless network 100 and received from the same mobile station. Thus, PRES1, PRES2, PRES3, . . . , PRESn are all associated with the same mobile station. Page Response table 212 also may store other Page Response messages (not shown) received by BS 101, BS 102, BS 103, etc. from other mobile stations. Again, however, it is sufficient for the purposes of this disclosure to explain the operation of MSC 140 with respect to only one mobile station. For the purposes of clarity and brevity in explaining the operation of MSC 140, these other Page Response messages are not shown or further described in order to avoid redundant description.

The operation of the present invention is controlled by application program 213, which is executed by message control processor 201. Those skilled in the art will readily understand that while the present invention may advantageously be implemented using one or more data processors and one or more associated memories to execute a stored application program, the present invention may also be implemented in numerous other conventional manners. For example, the present invention may be implemented as a state machine using programmable array logic (PAL) circuits or similar devices. Those skilled in the art will also readily understand that these other embodiments can be made without departing from the spirit and scope of the invention in its broadest form.

According to an advantageous embodiment, message control processor 201 of MSC 140 transmits only one Assignment Request message to one of BS 101, BS 102, or BS 103 for a given mobile station on a per call basis. Each of BS 101, BS 102, or BS 103 may continue to send CM Service Request messages for every Origination message or Paging Response message received from a given mobile station on a per call basis.

For Call Origination messages, message control processor 201 processes the first received CM Service Request message (CMSR1).

If message control processor 201 receives a second CM Service Request message (CMSR2) message from the same mobile station within a specified time period 'T', message control processor 201 compares the "cell information" stored by the mobile station in the two CM Service Request messages (CMSR1 and CMSR2). The cell information identifies all of the base stations from which the mobile station is receiving signals. If the cell information is the same, message control processor 201 ignores CMSR2, continues processing CMSR1, and sends the Assignment Request message to the BS from which CMSR1 was received. If the cell information is different, then message control processor 201 stops processing the CMSR1 and processes CMSR2. If message control processor 201 receives yet another CMSR message (CMSR3) from the same mobile station within the specified time period 'T', message control processor 201 repeats the above-described process. The process may be repeated 'n' times. Both 'T' and 'n' are vendor or operator configurable parameters.

For Page Response messages, message control processor 201 processes the first-received Paging Response message (PRES1) message. If message control processor 201 receives a second Paging Response message (PRES2) from the same mobile station within a specified time period 'T', then message control processor 201 compares the cell information in the two Paging Response messages (PRES1 and PRES2). Again, the cell information identifies all of the base stations from which the mobile station is receiving signals. If the cell information is the same, message control processor 201 ignores PRES2, continues processing PRES1, and sends the Assignment Request message to the BS from which PRES1 was received. If the cell information is different, message control processor 201 stops processing PRES1 and processes PRES2. If message control processor 201 receives yet another PRES message (PRES3) from the same mobile station within the specified time period 'T', message control processor 201 repeats the above-described process. The process may be repeated 'n' times. Again, both 'T' and 'n' are vendor or operator configurable parameters.

Figure 3:
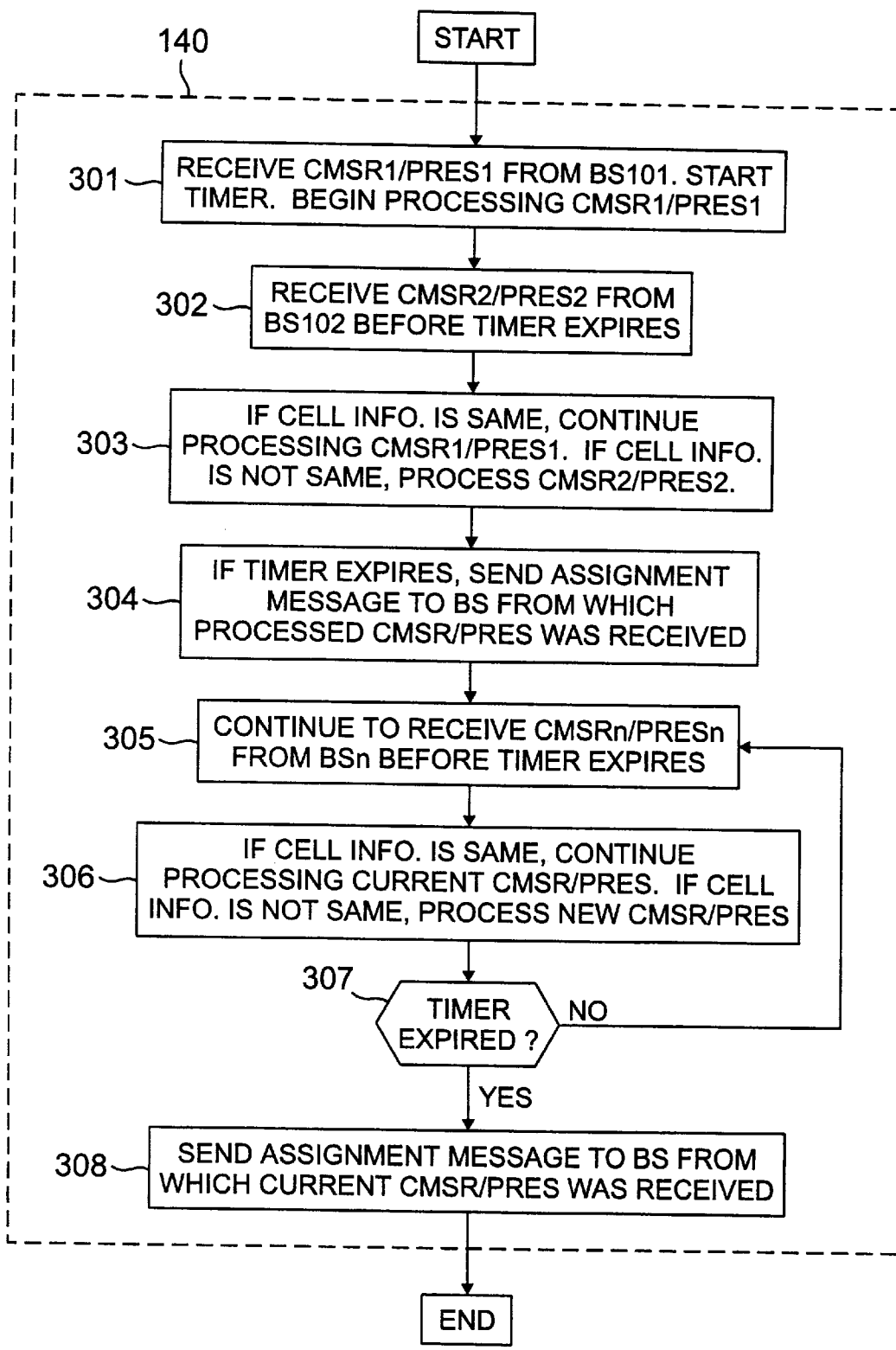
FIG. 3 is a message flow diagram illustrating the operation of a mobile switching center and bases stations in a CDMA wireless network in accordance with the present invention.

The above-described operation is graphically illustrated in FIG. 3. FIG. 3 is a flow diagram illustrating in greater detail the operation of mobile switching center (MSC) 140 according to one embodiment of the present invention. Depending on whether a mobile station is initiating an outgoing call or receiving an incoming call, MSC 140 receives either CMSR1 or PRES1 from, for example, BS 101. MSC 140 then starts timer 205 to control the time period, T (process step 301). MSC 140 extracts from the CMSR1 message or PRES1 message 1) identification data that identifies the mobile station that sent the CMSR1/PRES1 message and 2) cell information indicating which base stations can be received by the mobile station.

As MSC 140 continues to monitor the base stations, MSC 140 may receive CMSR2/PRES2 from the same mobile station via, for example, BS 102 before timer 205 expires (process step 302). If the cell information sent by the mobile station is the same, MSC 140 continues processing the first received CMSR1/PRES1 message. However, if the cell information is different, MSC 140 stops processing the first received CMSR1/PRES1 message and begins to process the later received CMSR2/PRES2 message instead (process step 303).

If timer 205 expires before any additional CMSR messages or PRES messages are received, an Assignment message is sent to the base station (i.e., BS 101 or BS 102) from which the processed CMSR message (i.e., CMSR1 or CMSR2) or processed PRES message (i.e., PRES1 or PRES2) was received (process step 304). If timer 205 does not expire, MS 140 continues to receive additional CMSR messages or PRES messages from the mobile station via one or more base stations (process step 305). In all cases, if the cell information sent by the mobile station is the same, MSC 140 continues processing the current CMSRn/PRESn message. However, if the cell information is different, MSC 140 stops processing the current .CMSRn/PRESn message and begins to process the new CMSRm/PRESm message instead (process step 306). Timer 205 is continually monitored to determine if the period, T, has expired (process step 307). When timer 205 finally expires, the Assignment message is sent to the base station from which the current CMSR/PRES message was received.

Figure 4:
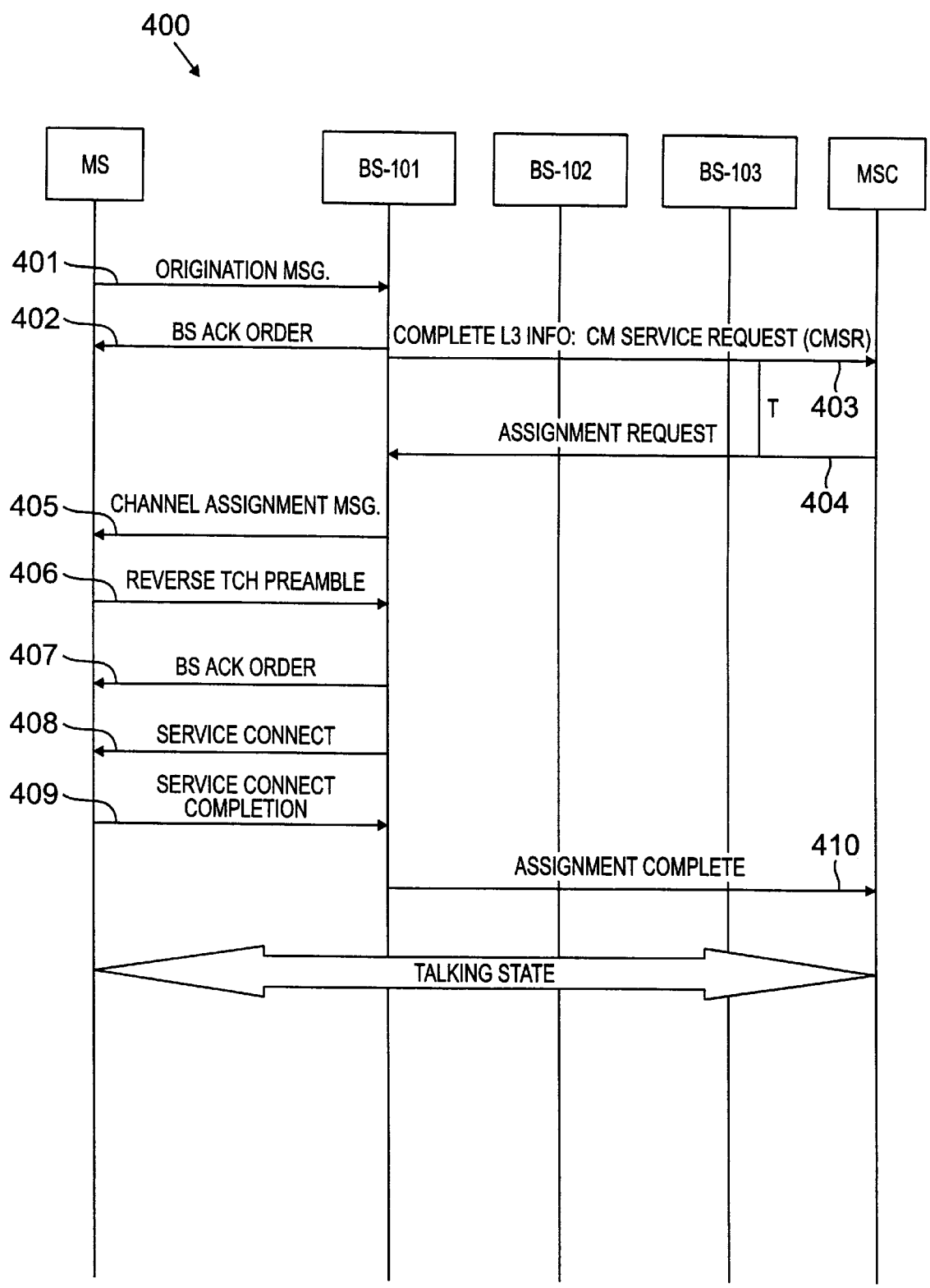
FIG. 4 is a message flow diagram illustrating a prior art call origination operation in which an exemplary mobile station (MS) initiates access to a base station and a mobile switching center in a CDMA wireless network.

FIGS. 4–11 illustrate the effect of the present invention on the message traffic between MSC 140 and exemplary base stations, BS 101, BS 102 and BS 103. FIG. 4 depicts message flow diagram 400, which illustrates a prior art call origination operation in which an exemplary mobile station (MS) initiates access to base stations and mobile switching center 140 in wireless network 100. By way of example, the prior art call origination operation may be carried out in accordance with the IS-634 standards. Initially, the accessing mobile station is aware of the presence of BS 101, BS 102 and BS 103 because of pilot channel signals received from the base stations. To initiate a call, the mobile station transmits an Origination message to, for example, BS 101 (process step 401). Among other things, the Origination message contains data fields that identify all of the base stations from which the accessing mobile station is receiving signals (in this case, BS 101, BS 102 and BS 103).

BS 101 responds by sending a Base Station. (BS) Acknowledgment Order message to the accessing mobile station (process step 402). BS 101 also sends a CM Service Request message to mobile switching center (MSC) 140 (process step 403). CM Service Request message contains, among other things, data fields identifying the base stations from which the accessing mobile station is receiving signals (i.e., BS 101, BS 102 and BS 103). MSC 140 responds by sending an Assignment Request message to BS 101 (process step 404).

In response, BS 101 allocates system resources, including radio channels and equipment to handle the call from the accessing mobile station. BS 101 does this by transmitting a Channel Assignment message to the mobile station assigning the mobile station to a transmit channel and a receive channel in the cell site (process step 405). The mobile station responds by transmitting a Reverse Traffic Channel Preamble message to BS 101 (process step 406).

If the Reverse Traffic Channel Preamble message is properly received, BS 101 sends the mobile station a Base Station Acknowledgment Order message (process step 407) and a Service Connect message (process step 408) indicating that the mobile station connection is now complete. The mobile station responds by sending BS 101 a Service Connect Completion message (process step 409). BS 101 then sends an Assignment Complete message to MSC 140 (process step 410). At this point, a "talking state" commences in which the user of the mobile station may engage in a two way conversation via the wireless network.

In the scenario above, it is entirely possible that the mobile station may send multiple Origination messages to BS 101, BS 102, BS 103, and other base stations. In the prior art systems, this causes each base station to send a CM Service Request message to MSC 140, which responds by sending an Assignment Request message to each such base station. As a result, each base station at least temporarily assigns radio resources to handle the call from the mobile station, even though only one base station will ultimately handle the call. Furthermore, the amount of message traffic on the BS-MSC interface increases unnecessarily.

Figure 5:
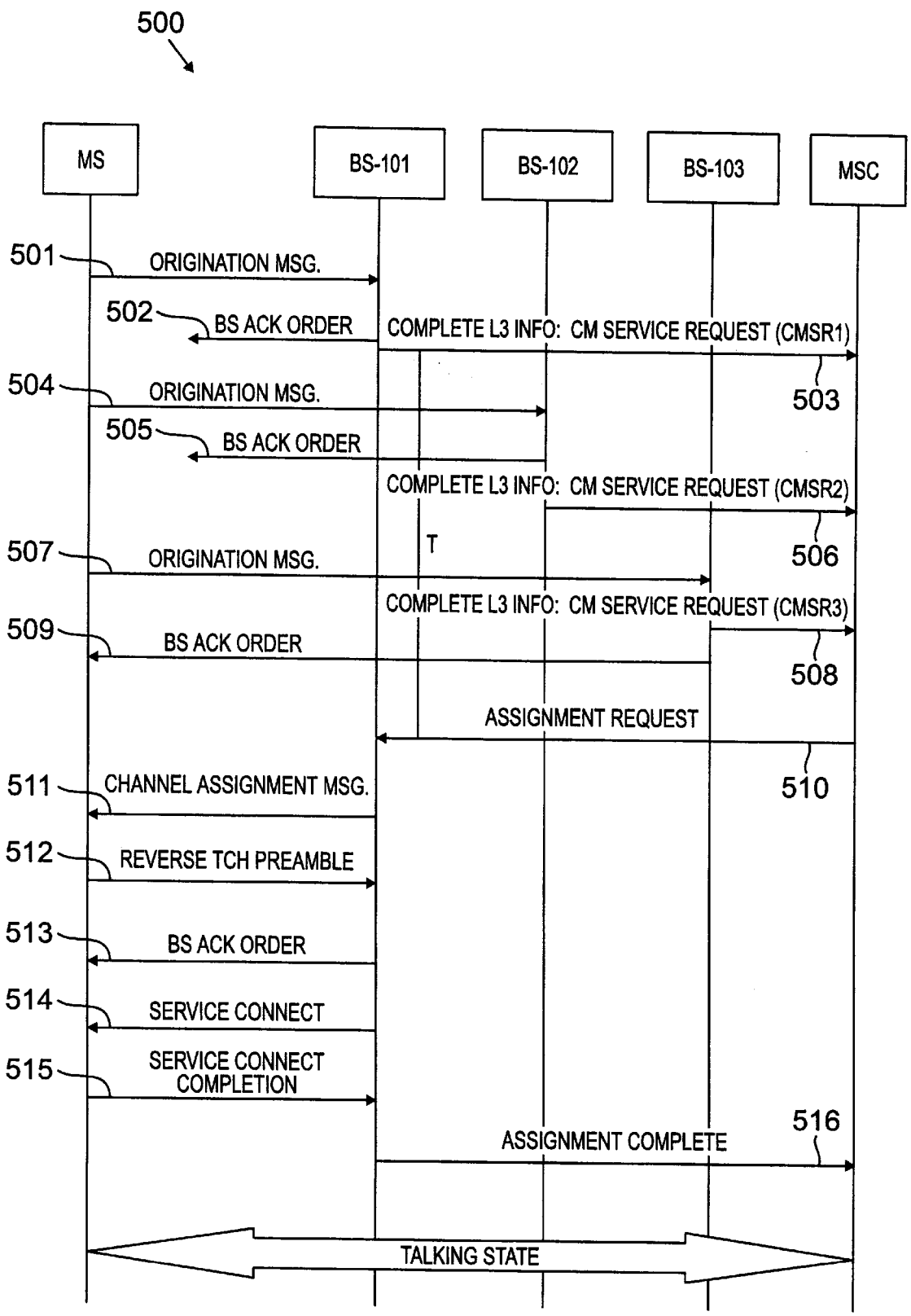
FIG. 5 is a message flow diagram illustrating a call origination operation according to one embodiment of the present invention in which an exemplary mobile station (MS) initiates access to base stations and mobile switching center in a wireless network.

FIG. 5 depicts message flow diagram 500, which illustrates a call origination operation according to one embodiment of the present invention in which an exemplary mobile station (MS) initiates access to base stations and mobile switching center 140 in wireless network 100. In the illustrated example, the mobile station sends an Origination message to each of a plurality of base stations and each of the Origination messages contains the same cell information.

Initially, the accessing mobile station is aware of the presence of BS 101, BS 102 and BS 103 because of pilot channel signals received from the base stations. To initiate a call, the mobile station transmits an Origination message to, for example, BS 101 (process step 501). Among other things, the Origination message contains "cell" information, namely data fields that identify all of the base stations from which the accessing mobile station is receiving signals (i.e., BS 101, BS 102 and BS 103).

BS 101 responds by sending a Base Station (BS) Acknowledgment Order message to the accessing mobile station (process step 502). However, the BS Acknowledgment Order message is not received by the mobile station. BS 101 also sends a CM Service Request (CMSR1) message to mobile switching center (MSC) 140 (process step 503). CMSR1 message contains, among other things, data fields identifying the base stations from which the accessing mobile station is receiving signals (i.e., BS 101, BS 102 and BS 103). In response, MS 140 activates time 205 and begins counting down the time period, T, during which MS 140 processes CMSR1.

Since the first BS Acknowledgment Order message was not received by the mobile station, the mobile station sends an Origination message to BS 102 (process step 504). BS 102 responds by sending a Base Station (BS) Acknowledgment Order message to the accessing mobile station (process step 505). Again, however, the BS Acknowledgment Order message is not received by the mobile station. BS 102 also sends a CM Service Request (CMSR2) message to mobile switching center (MSC) 140 (process step 506). CMSR2 message contains the same information in the data fields identifying the base stations from which the accessing mobile station is receiving signals that is contained in CMSR1. At this point, the time period, T, has not expired. Since the cell information in CMSR1 and CMSR2 are the same, MSC 140 ignores CMSR2 and continued processing CMSR1.

Since the second BS Acknowledgment Order message was also not received by the mobile station, the mobile station sends an Origination message to BS 103 (process step 507). BS 103 sends a CM Service Request (CMSR3) message to mobile switching center (MSC) 140 (process step 508). CMSR3 message contains the same information in the data fields identifying the base stations from which the accessing mobile station is receiving signals that is contained in CMSR1 (and CMSR2). At this point, the time period, T, has not expired. Since the cell information in CMSR3 and CMSR1 are the same, MSC 140 ignores CMSR3 and continues processing CMSR1. BS 103 also responds by sending a Base Station (BS) Acknowledgment Order message to the accessing mobile station (process step 509). This BS Acknowledgment Order message is received by the mobile station and the mobile station does not transmit additional Origination messages.

Finally, MSC 140 finishes processing CMSR1 message and terminates the timer 205. MSC 140 also transmits an Assignment Request message to BS 101 (process step 510). In response, BS 101 allocates system resources, including radio channels and equipment to handle the call from the accessing mobile station. BS 101 does this by transmitting a Channel Assignment message to the mobile station assigning the mobile station to a transmit channel and a receive channel in the cell site (process step 511). The mobile station responds by transmitting a Reverse Traffic Channel Preamble message to BS 101 (process step 512). If the Reverse Traffic Channel Preamble message is properly received, BS 101 sends the mobile station a Base Station Acknowledgment Order message (process step 513) and a Service Connect message (process step 514) indicating that the mobile station connection is now complete. The mobile station responds by sending BS 101 a Service Connect Completion message (process step 515). BS 101 then sends an Assignment Complete message to MSC 140 (process step 516). At this point, a "talking state" commences in which the user of the mobile station may engage in a two way conversation via the wireless network.

Figure 6:
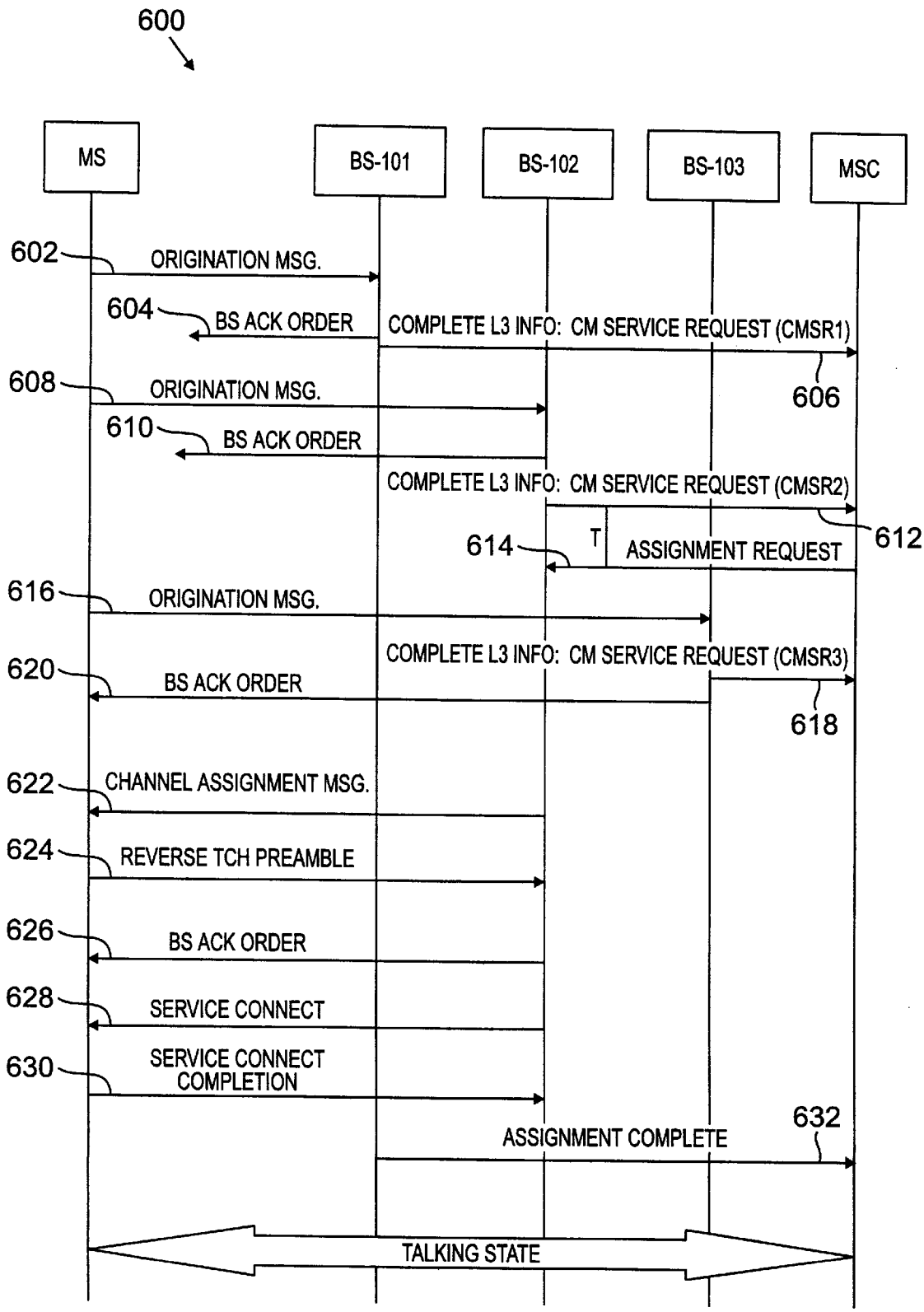
FIG. 6 is a message flow diagram illustrating a call origination operation according to another embodiment of the present invention.

FIG. 6 depicts message flow diagram 600, which illustrates a call origination operation according to one embodiment of the present invention in which an exemplary mobile station (MS) initiates access to base stations and mobile switching center 140 in wireless network 100. In the illustrated example, the mobile station sends an Origination message to each of a plurality of base stations, but the cell information in the first Origination message is not the same as in the second and subsequent Origination messages.

Initially, the mobile station transmits an Origination message to BS 101 (process step 602). The Origination message contains cell information indicating that the accessing mobile station is receiving signals from BS 101, BS 102 and BS 103. BS 101 responds by sending a BS Acknowledgment Order message to the accessing mobile station (process step 604). However, the BS Acknowledgment Order message is not received by the mobile station. BS 101 also sends CMSR1 message to MSC 140 (process step 606). CMSR1 message contains the cell information indicating that the accessing mobile station is receiving signals from BS 101, BS 102 and BS 103. In response, MS 140 activates time 205 and begins counting down the time period, T, during which MS 140 processes CMSR1.

Since the first BS Acknowledgment Order message was not received by the mobile station, the mobile station sends an Origination message to BS 102 (process step 608). The cell information in the second Origination message is not the same as the cell information in the first Origination message. BS 102 responds by sending a BS Acknowledgment Order message to the accessing mobile station (process step 610). Again, however, the BS Acknowledgment Order message is not received by the mobile station. BS 102 also sends CMSR2 message to MSC 140 (process step 612). The cell information in the CMSR2 message is not the same as the cell-information in the CMSR1 message. At this point, the time period, T, has not expired. Since the cell information in the CMSR1 message and the CMSR2 message are different, MSC 140 stops processing the CMSR1 message and begins processing the CMSR2 message. The MSC 140 then resets timer 205. Finally, MSC 140 finishes processing the CMSR2 message. MSC 140 also transmits an Assignment Request message to BS 102 (process step 614). Timer 205 subsequently counts down the timer period, T.

Since the second BS Acknowledgment Order message was also not received by the mobile station, the mobile station sends an Origination message to BS 103 (process step 616). BS 103 sends CMSR3 message to MSC 140 (process step 618). BS 103 also responds by sending a BS Acknowledgment Order message to the accessing mobile station (process step 620). This BS Acknowledgment Order message is received by the mobile station and the mobile station does not transmit additional Origination messages.

In response to the Assignment Request message received from MSC 140, BS 102 transmits a Channel Assignment message to the mobile station assigning the mobile station to a transmit channel and a receive channel in the cell site (process step 622). The mobile station responds by transmitting a Reverse Traffic Channel Preamble message to BS 102 (process step 624). If the Reverse Traffic Channel Preamble message is properly received, BS 102 sends the mobile station a BS Acknowledgment Order message (process step 626) and a Service Connect message (process step 628) indicating that the mobile station connection is now complete. The mobile station responds by sending BS 102 a Service Connect Completion message (process step 630). BS 102 then sends an Assignment Complete message to MSC 140 (process step 632). At this point, a "talking state" commences in which the user of the mobile station may engage in a two way conversation via the wireless network.

Figure 7:
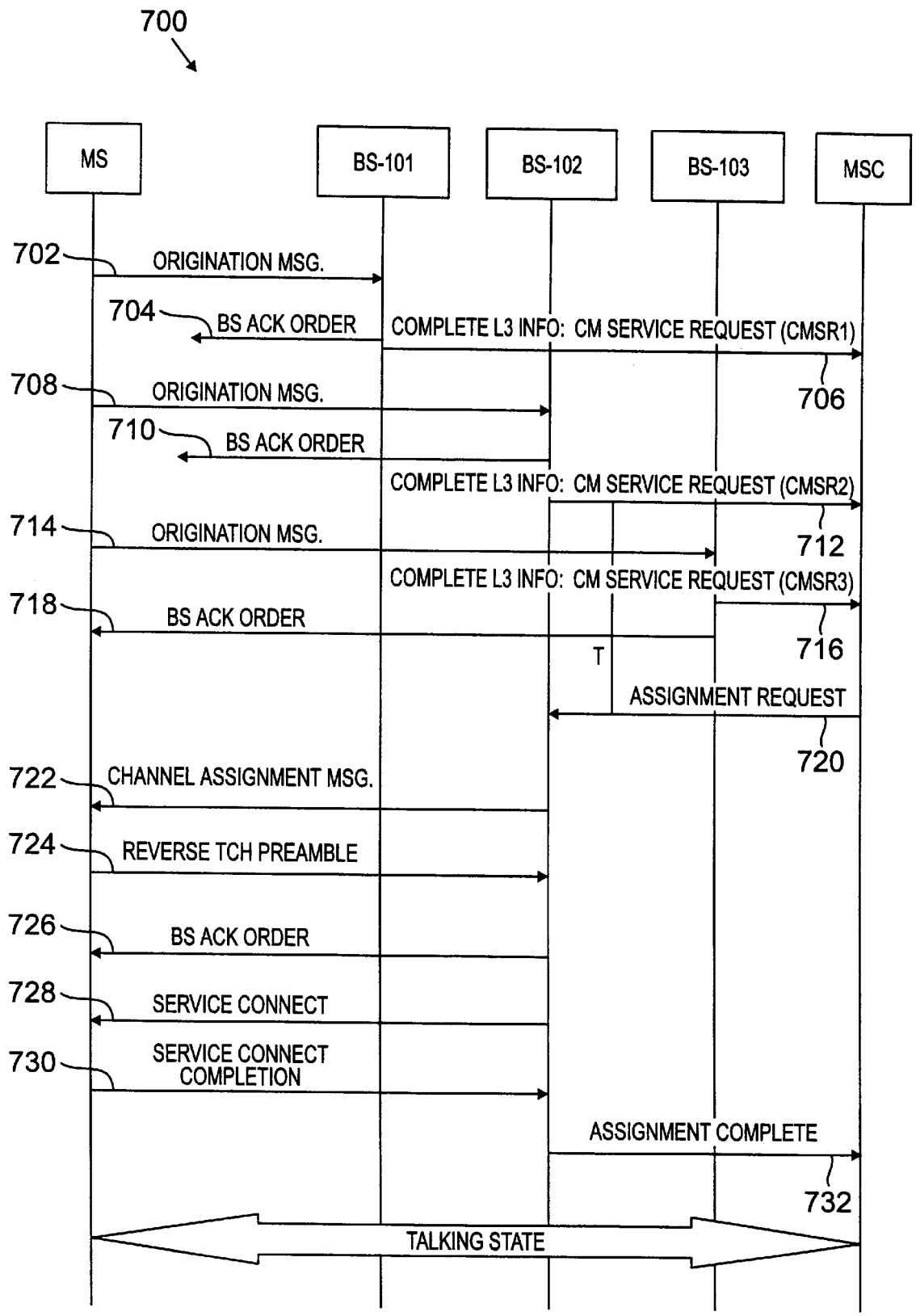
FIG. 7 is a message flow diagram illustrating a call origination operation according to another embodiment of the present invention.

FIG. 7 depicts message flow diagram 700, which illustrates a call origination operation according to one embodiment of the present invention in which an exemplary mobile station (MS) initiates access to base stations and mobile switching center 140 in wireless network 100. In the illustrated example, the mobile station sends an Origination message to each of a plurality of base stations, but the cell information in the first Origination message is not the same as in the second and subsequent Origination messages. Unlike the scenario described in FIG. 6, however, timer 205 does not expire before the mobile station receives a BS Acknowledgment Order message.

Initially, the mobile station transmits an Origination message to BS 101 (process step 702). The Origination message contains cell information indicating that the accessing mobile station is receiving signals from BS 101, BS 102 and BS 103. BS 101 responds by sending a BS Acknowledgment Order message to the accessing mobile station (process step 704). However, the BS Acknowledgment Order message is not received by the mobile station. BS 101 also sends CMSR1 message to MSC 140 (process step 706). CMSR1 message contains the cell information indicating that the accessing mobile station is receiving signals from BS 101, BS 102 and BS 103. In response, MS 140 activates timer 205 and begins counting down the time period, T, during which MS 140 processes CMSR1.

Since the first BS Acknowledgment Order message was not received by the mobile station, the mobile station sends an Origination message to BS 102 (process step 708). The cell information in the second Origination message is not the same as the cell information in the first Origination message. BS 102 responds by sending a BS Acknowledgment Order message to the accessing mobile station (process step 710). Again, however, the BS Acknowledgment Order message is not received by the mobile station. BS 102 also sends CMSR2 message to MSC 140 (process step 712). The cell information in the CMSR2 message is not the same as the cell information in the CMSR1 message. Since the cell information in the CMSR1 message and the CMSR2 message are different, MSC 140 stops processing the CMSR1 message and begins processing the CMSR2 message. The MSC 140 then resets timer 205.

Since the second BS Acknowledgment Order message was also not received by the mobile station, the mobile station sends an Origination message to BS 103 (process step 714). In response, BS 103 sends CMSR3 message to MSC 140 (process step 716). BS 103 also sends a BS Acknowledgment Order message to the accessing mobile station (process step 718). This BS Acknowledgment Order message is received by the mobile station and the mobile station does not transmit additional Origination messages. The cell information in the CMSR3 message is the same as the cell information in the CMSR2 message. At this point, timer 205 has not expired. However, since the cell information in the CMSR3 message and the CMSR2 message are identical, MSC 140 ignores the CMSR3 message. MSC 140 does not send an Assignment Request message to BS 103. Finally, MSC 140 finishes processing the CMSR2 message and transmits an Assignment Request message to BS 102 (process step 720).

In response to the Assignment Request message received from MSC 140, BS 102 transmits a Channel Assignment message to the mobile station assigning the mobile station to a transmit channel and a receive channel in the cell site (process step 722). The mobile station responds by transmitting a Reverse Traffic Channel Preamble message to BS 102 (process step 724). If the Reverse Traffic Channel Preamble message is properly received, BS 102 sends the mobile station a Base Station Acknowledgment Order message (process step 726) and a Service Connect message (process step 728) indicating that the mobile station connection is now complete. The mobile station responds by sending BS 102 a Service Connect Completion message (process step 730). BS 102 then sends an Assignment Complete message to MSC 140 (process step 732). At this point, a "talking state" commences in which the user of the mobile station may engage in a two way conversation via the wireless network.

Figure 8:
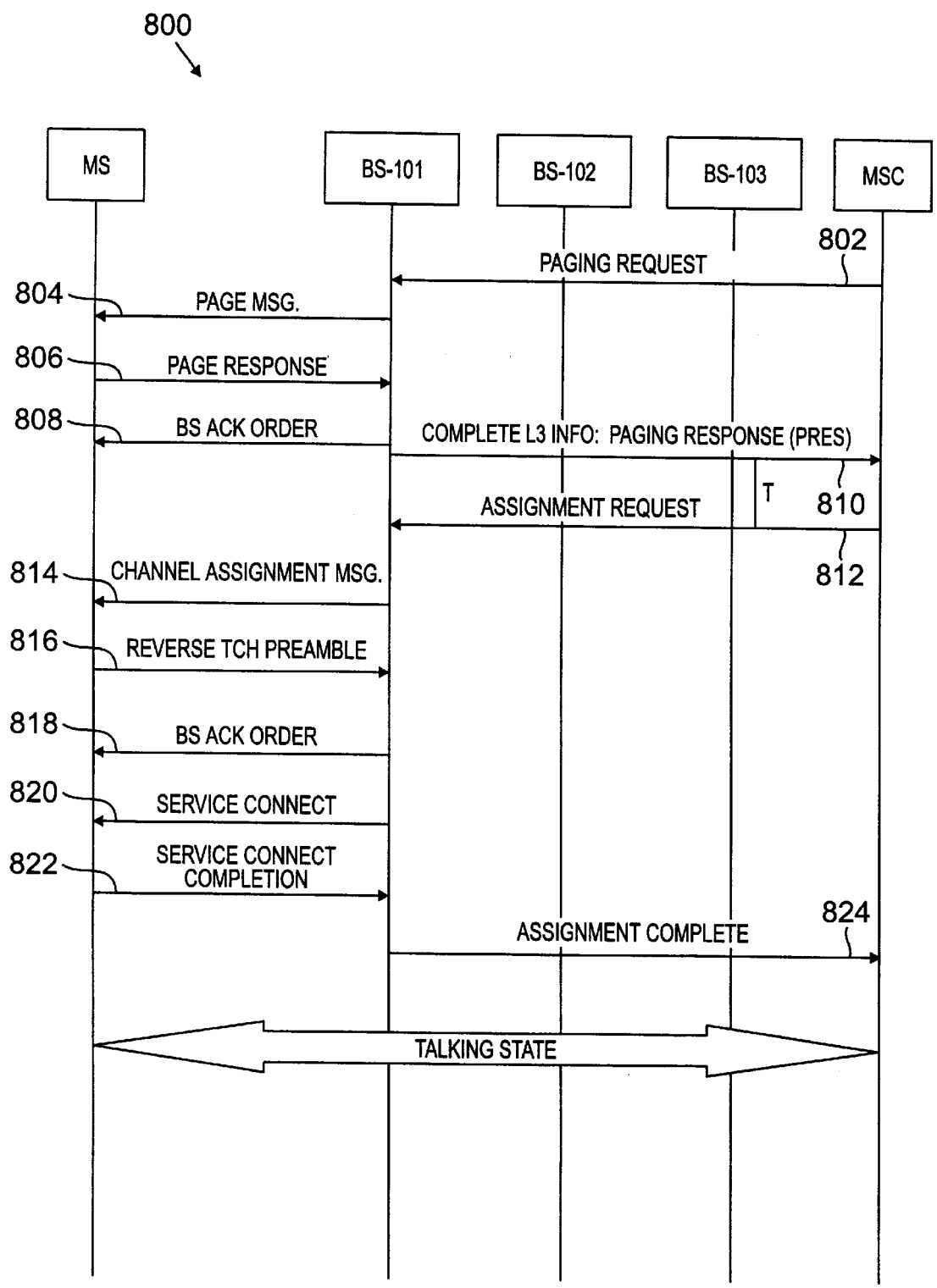
FIG. 8 is a message flow diagram illustrating a prior art call termination operation in which an exemplary mobile station (MS) receives a call from base stations and mobile switching center in a CDMA wireless network.

FIG. 8 depicts message flow diagram 800, which illustrates a prior art call termination operation in which an exemplary mobile station (MS) receives a call from base stations and mobile switching center 140 in wireless network 100. Initially, the mobile station is aware of the presence of BS 101, BS 102 and BS 103 because of pilot channel signals received from the base stations. Additionally, BS 101 and MSC 140 are aware of the mobile station, which registered with wireless network 100 when first turned on.

In the illustrated example, MSC 140 responds to an incoming call received from the wired backbone of wireless network 100 by sending a Paging Request message to BS 101 (process step 802). BS 101 in turn transmits a Page message to the mobile station (process step 804). The mobile station responds by transmitting a Page Response message back to BS 101 (process step 806). The Page Response message contains cell information indicating that the accessing mobile station is receiving signals from one or more of BS 101, BS 102 and BS 103. BS 101 responds by sending a BS Acknowledgment Order message to the mobile station (process step 808). BS 101 also sends a Paging Response (PRES) message to MSC 140 (process step 810).

MSC 140 responds by sending an Assignment Request message to BS 101 (process step 812). In response, BS 101 allocates system resources to handle the call by transmitting a Channel Assignment message to the mobile station. This assigns the mobile station to transmit and receive channels in the cell site (process step 814). The mobile station responds by transmitting a Reverse Traffic Channel Preamble message to BS 101 (process step 816).

If the Reverse Traffic Channel Preamble message is properly received, BS 101 sends the mobile station a BS Acknowledgment Order message (process step 818) and a Service Connect message (process step 820) indicating that the mobile station connection is now complete. The mobile station responds by sending BS 101 a Service Connect Completion message (process step 822). BS 101 then sends an Assignment Complete message to MSC 140 (process step 824). At this point, a "talking state" commences in which the user of the mobile station may engage in a two way conversation via the wireless network.

Figure 9:
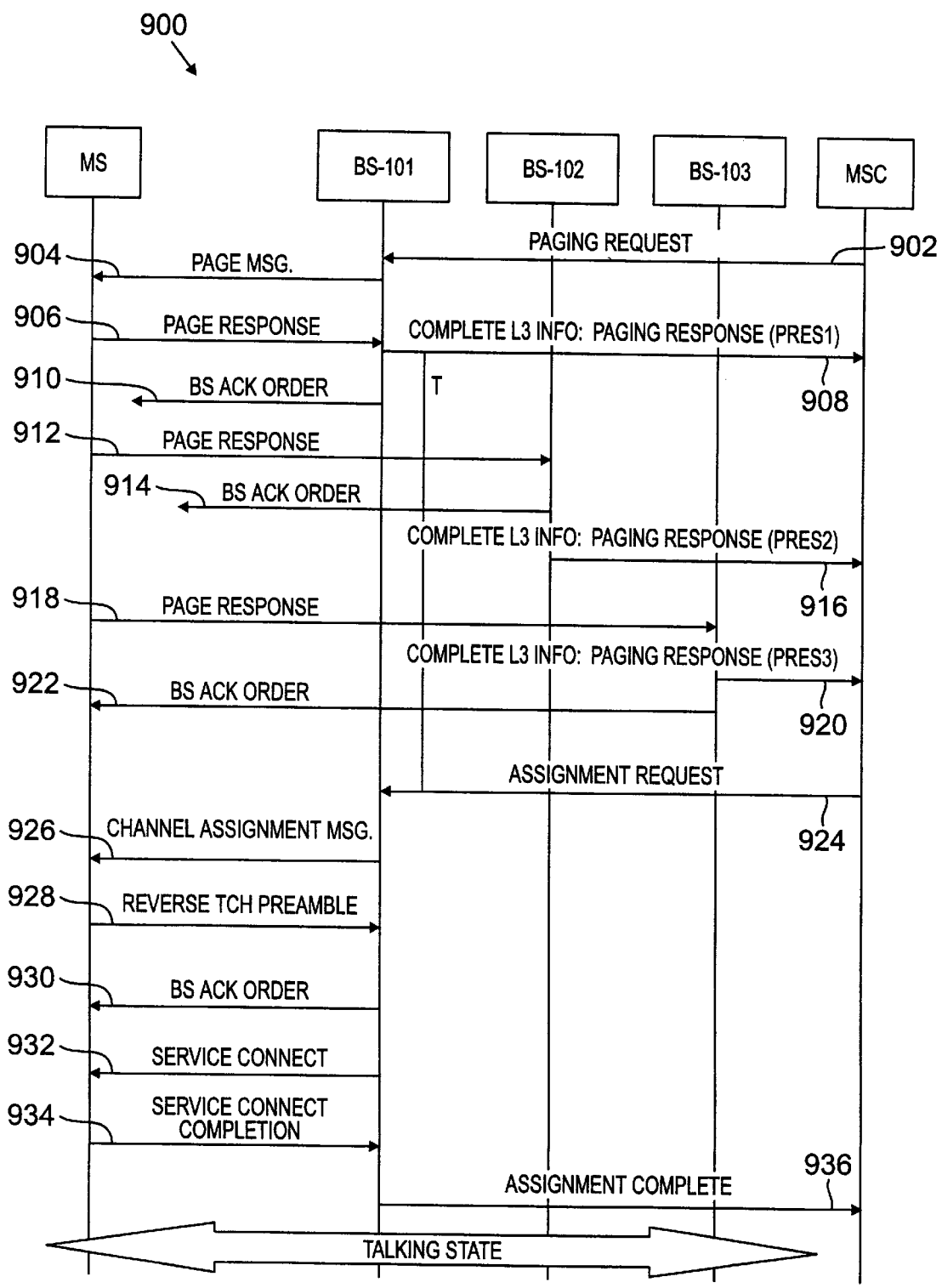
FIG. 9 is a message flow diagram illustrating a call termination operation according to an embodiment of the present invention in which a mobile station (MS) receives a call from base stations and a mobile switching center in a CDMA wireless network.

FIG. 9 depicts message flow diagram 900, which illustrates a call termination operation according to one embodiment of the present invention, in which an exemplary mobile station (MS) receives a call from base stations and mobile switching center 140 in wireless network 100. As in the case of the prior art, the mobile station is aware of the presence of BS 101, BS 102 and BS 103 because of pilot channel signals received from the base stations. Additionally, BS 101 and MSC 140 are aware of the mobile station, which registered with wireless network 100 when first turned on. In the illustrated example, the mobile station sends a Page Response message to each of a plurality of base stations and each of the Page Response messages contains the same cell information.

MSC 140 responds to an incoming call received from the wired backbone of wireless network 100 by sending a Paging Request message to BS 101 (process step 902). BS 101 in turn transmits a Page message to the mobile station (process step.904). The mobile station responds by transmitting a Page Response message back to BS 101 (process step 906). The Page Response message contains cell information indicating that the accessing mobile station is receiving signals from one or more of BS 101, BS 102 and BS 103.

BS 101 responds by transmitting to MSC 140 a Layer 3 (L3) message containing the contents of the Page Response message transmitted by the MS (process step 908). Hereafter, a Page Response message embedded in an L3 message sent from a base station to MSC 140 shall be referred to as PRES1, PRES2, PRES3, etc. In response to the PRES1 message, MS 140 activates timer 205 and begins counting down the time period, T, during which MS 140 processes PRES1. BS 101 also transmits a BS Acknowledgment Order message to the mobile station (process step 910). However, the BS Acknowledgment Order message is not received by the mobile station.

Since it did not receive a BS Acknowledgment Order message from BS 101, the mobile station transmits another Page Response message to BS 102 (process step 912). BS 102 responds by sending a BS Acknowledgment Order message to the mobile station (process step 914). Again, however, this second BS Acknowledgment Order message is also not received by the mobile station. BS 102 also sends PRES2 message to MSC 140 (process step 916). PRES2 message contains the same information identifying the base stations from which the mobile station is receiving signals that is contained in PRES1. At this point, the time period, T, has not expired. Since the cell information in PRES2 and PRES1 are the same, MSC 140 ignores PRES2 and continues processing PRES1.

Since it did not receive a BS Acknowledgment Order message from BS 102, the mobile station transmits another Page Response message to BS 103 (process step 918). BS 103 responds by sending PRES3 message to MSC 140 (process step 920). PRES3 message contains the same information identifying the base stations from which the mobile station is receiving signals that is contained in PRES1 and PRES2. Since the cell information in PRES3 and PRES1 are the same, MSC 140 ignores PRES3 and continues processing PRES1. BS 103 also sends a BS Acknowledgment Order message to the mobile station (process step 922). This BS Acknowledgment Order message is received by the mobile station.

Finally, MSC 140 finishes processing PRES1 message and terminates timer 205. MSC 140 sends an Assignment Request message to BS 101 (process step 924). In response, BS 101 allocates system resources to handle the call by transmitting a Channel Assignment message to the mobile station. This assigns the mobile station to transmit and receive channels in the cell site (process step 926). The mobile station responds by transmitting a Reverse Traffic Channel Preamble message to BS 101 (process step 928).

If the Reverse Traffic Channel Preamble message is properly received, BS 101 sends the mobile station a BS Acknowledgment Order message (process step 930) and a Service Connect message (process step 932) indicating that the mobile station connection is now complete. The mobile station responds by sending BS 101 a Service Connect Completion message (process step 934). BS 101 then sends an Assignment Complete message to MSC 140 (process step 936). At this point, a "talking state" commences in which the user of the mobile station may engage in a two way conversation via the wireless network.

Figure 10:
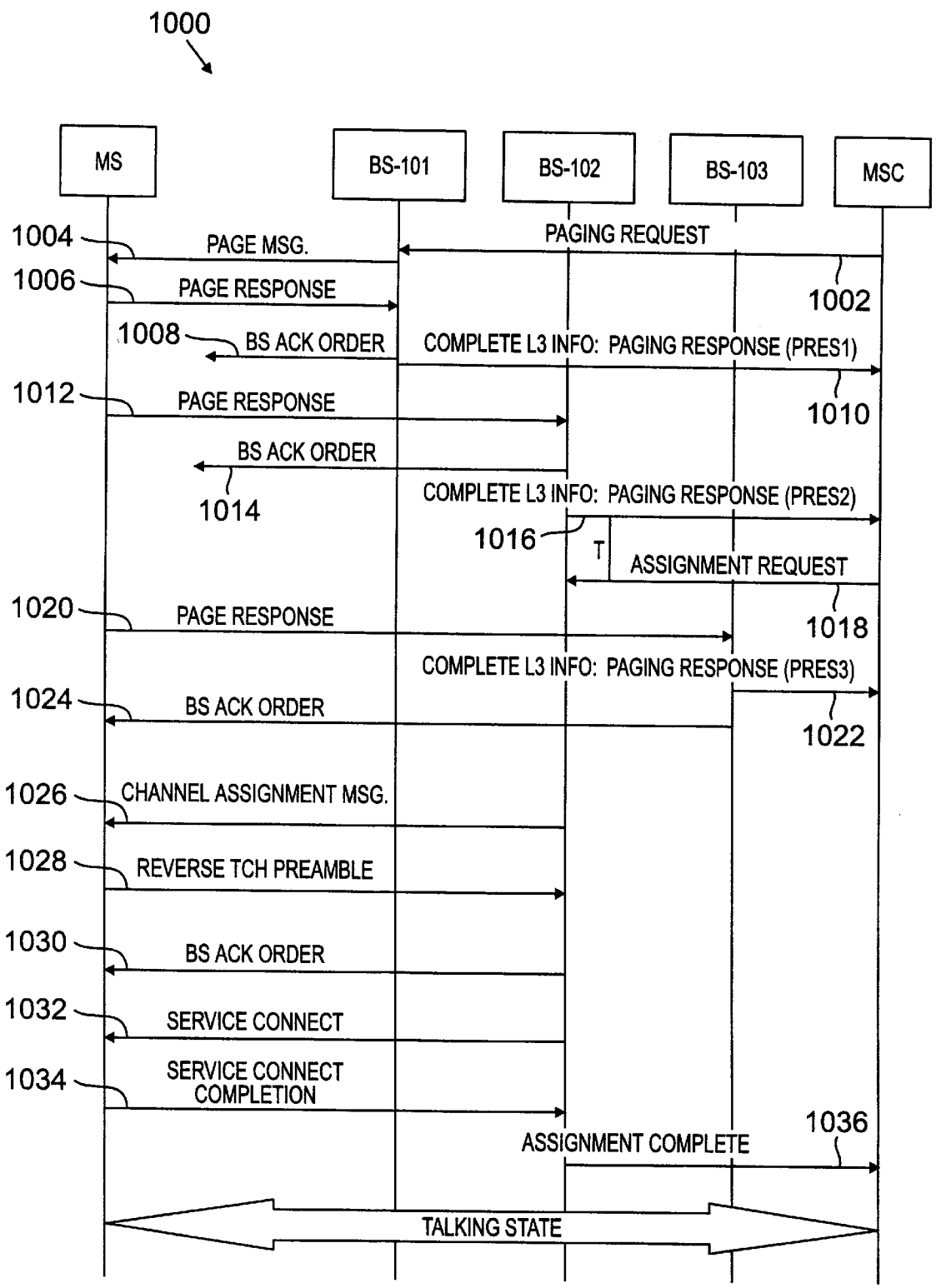
FIG. 10 is a message flow diagram illustrating a call termination operation according to another embodiment of the present invention.

FIG. 10 depicts message flow diagram 1000, which illustrates a call termination operation according to one embodiment of the present invention, in which an exemplary mobile station (MS) receives a call from base stations and mobile switching center 140 in wireless network 100. In the illustrated example, the mobile station sends a Page Response message to each of a plurality of base stations, but the cell information is not the same in all of the Page Response messages. Also, timer 205 expires before all Page Response messages are received by MSC 140.

MSC 140 responds to an incoming call received from the wired backbone of wireless network 100 by sending a Paging Request message to BS 101 (process step 1002). BS 101 in turn transmits a Page message to the mobile station (process step 1004). The mobile station responds by transmitting a Page Response message back to BS 101 (process step 1006). The Page Response message contains cell information indicating that the MS is receiving signals from one or more of BS 101, BS 102 and BS 103. BS 101 responds by transmitting a BS Acknowledgment Order message to the mobile station (process step 1008). However, the BS Acknowledgment Order message is not received by the mobile station. BS 101 also sends to MSC 140 a PRES1 message containing the contents of the Page Response message transmitted by the MS (process step 1010). In response to the PRES1 message, MS 140 activates timer 205 and begins counting down the time period, T, during which MS 140 processes PRES1.

Since it did not receive a BS Acknowledgment Order message from BS 101, the mobile station transmits another Page Response message to BS 102 (process step 1012). BS 102 responds by sending a BS Acknowledgment Order message to the mobile station (process step 1014). Again, however, this second BS Acknowledgment Order message is also not received by the mobile station. BS 102 also sends PRES2 message to MSC 140 (process step 1016). The cell information in the PRES2 message, however, is not the same as the cell information in the PRES1 message. At this point, the time period, T, has not expired. Since the cell information in PRES2 is different, MSC 140 stops processing PRES1 and begins processing PRES2. MSC 140 then resets timer 205. Finally, MSC 140 finishes processing PRES2 and sends an Assignment Request message to BS 102 (process step 1018). Timer 205 then expires.

Since it did not receive a BS Acknowledgment Order message from BS 102, the mobile station transmits another Page Response message to BS 103 (process step 1020). In response, BS 103 sends PRES3 message to MSC 140 (process step 1022). PRES3 message contains the same cell information as PRES2 message. However, since timer 205 has expired, MSC 140 ignores PRES3. BS 103 also sends a BS. Acknowledgment Order message to the mobile station (process step 1024). This BS Acknowledgment Order message is received by the mobile station, which stops transmitting Page Response messages.

In response to the Assignment Request message, BS 102 allocates system resources to handle the call by transmitting a Channel Assignment message to the mobile station. This assigns the mobile station to transmit and receive channels in the cell site (process step 1026). Thereafter, process steps 1028, 1030, 1032, 1034, and 1036 are executed in a manner similar to process steps 928, 930, 932, 934, and 936. Further discussion of process steps 1028, 1030, 1032, 1034, and 1036 may be omitted to avoid redundant explanation.

Figure 11:
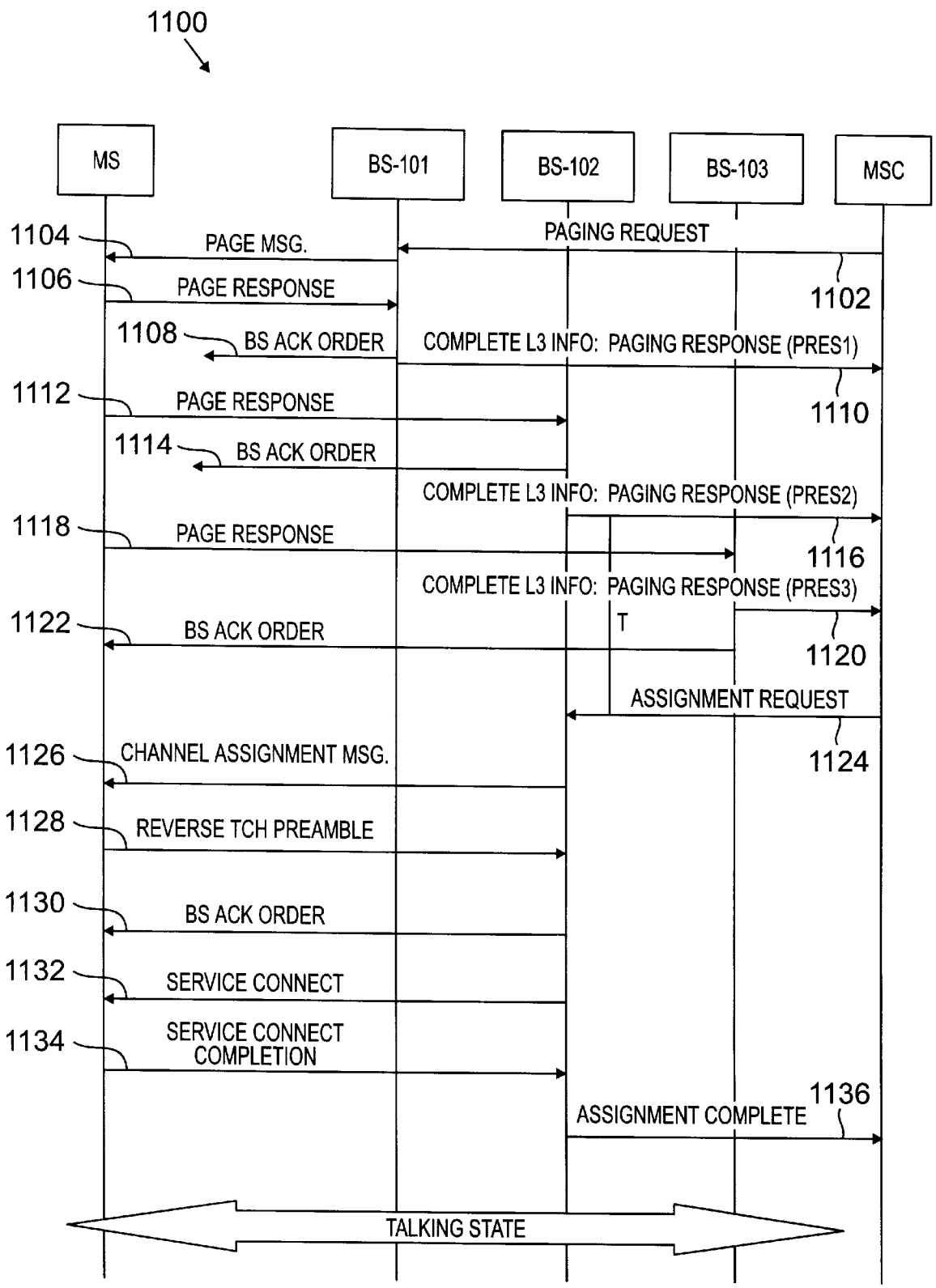
FIG. 11 is a message flow diagram illustrating a call termination operation according to another embodiment of the present invention.

FIG. 11 depicts message flow diagram 1100, which illustrates a call termination operation according to one embodiment of the present invention, in which an exemplary mobile station (MS) receives a call from base stations and mobile switching center 140 in wireless network 100. In the illustrated example, the mobile station sends a Page Response message to each of a plurality of base stations, but the cell information is not the same in all of the Page Response messages. In this example, timer 205 does not expire before all Page Response messages are received.

MSC 140 responds to an incoming call received from the wired backbone of wireless network 100 by sending a Paging Request message to BS 101 (process step 1102). BS 101 in turn transmits a Page message to the mobile station (process step 1104). The mobile station responds by transmitting a Page Response message back to BS 101 (process step 1106). The Page Response message contains cell information indicating that the MS is receiving signals from one or more of BS 101, BS 102 and BS 103.

BS 101 responds by transmitting a BS Acknowledgment Order message to the mobile station (process step 1108). However, the BS Acknowledgment Order message is not received by the mobile station. BS 101 also sends to MSC 140 a PRES1 message containing the contents of the Page Response message transmitted by the MS (process step 1110). In response to the PRES1 message, MS 140 activates timer 205 and begins counting down the time period, T, during which MS 140 processes PRES1.

Since it did not receive a BS Acknowledgment Order message from BS 101, the mobile station transmits another Page Response message to BS 102 (process step 1112). BS 102 responds by sending a BS Acknowledgment Order message to the mobile station (process step 1114). Again, however, this second BS Acknowledgment Order message is also not received by the mobile station. BS 102 also sends PRES2 message to MSC 140 (process step 1116). The cell information in the PRES2 message, however, is not the same as the cell information in the PRES1 message. At this point, the time period, T, has not expired. Since the cell information in PRES2 is different, MSC 140 stops processing PRES1 and begins processing PRES2. MSC 140 then resets timer 205.

Since it did not receive a BS Acknowledgment Order message from BS 102, the mobile station transmits another Page Response message to BS 103 (process step 1118). In response, BS 103 sends PRES3 message to MSC 140 (process step 1120). PRES3 message contains the same cell information as PRES2 message. Since the cell information is the same, MSC 140 ignores PRES3 message and continues processing PRES2 message. BS 103 also sends a BS Acknowledgment Order message to the mobile station (process step 1122). This BS Acknowledgment Order message is received by the mobile station, which stops transmitting Page Response messages. Finally, MSC 140 finishes processing PRES2 message and sends an Assignment Request message to BS 102 (process step 1124).

In response to the Assignment Request message, BS 102 allocates system resources to handle the call by transmitting a Channel Assignment message to the mobile station. This assigns the mobile station to transmit and receive channels in the cell site (process step 1126). Thereafter, process steps 1128, 1130, 1132, 1134, and 1136 are executed in a manner similar to process steps 928, 930, 932, 934, and 936. Further discussion of process steps 1128, 1130, 1132, 1134, and 1136 may be omitted to avoid redundant explanation.

Although the present invention has been described in detail, those skilled in the art should understand that they can make various changes, substitutions and alterations herein without departing from the spirit and scope of the invention in its broadest form.

What is claimed is:

1. For use in a wireless network comprising a plurality of base stations capable of communicating with a plurality of mobile devices, an apparatus for establishing a call connection between a first one of said plurality of mobile devices and one of said plurality of base stations, said apparatus comprising:

a message control processor for establishing said call connection, said message control processor capable of receiving from said plurality of base stations cell information messages generated by said first mobile station, each of said cell information messages comprising cell identification (ID) data identifying ones of said plurality of base stations from which said first mobile station is receiving wireless messages, wherein said message control processor, in response to receipt of a first cell information message from a first base station and receipt of a subsequent second cell information message from a second base station, compares the cell ID data within said first and second cell information messages, selectively processes only one of said first and second cell information messages based on the comparison of the cell ID data within said first and second cell information messages and transmits to only one of said first and second base stations a resource allocation message capable of establishing said call connection with said first mobile station.

2. The apparatus set forth in claim 1 wherein said apparatus is disposed in a mobile switching center of said wireless network.

3. The apparatus set forth in claim 1 wherein said message control processor compares first cell ID data of said first cell information message and second cell ID data of said second cell information message, and, if said second cell ID data is the same as said first cell ID data, said message control processor processes said first cell information message and transmits said resource allocation message to said first base station.

4. The apparatus set forth in claim 1 wherein said message control processor compares first cell ID data of said first cell information message and second cell ID data of said second cell information message, and, if said second cell ID data is different than said first cell ID data, said message control processor processes said second cell information message and transmits said resource allocation message to said second base station.

5. The apparatus set forth in claim 1 further comprising a timer associated with said message control processor capable of measuring a time period, T, after receipt of said first cell information message, wherein said message control processor processes only said first cell information messages and transmits said resource allocation message only to said first base station if said second cell information message is received after said time period, T, expires.

6. The apparatus set forth in claim 1 wherein said message control processor compares first cell ID data of said first cell information message and second cell ID data of said second cell information message, and, if said second cell ID data is the same as said first cell ID data, said message control processor continues processing said first cell information message and ignores said second cell information message.

7. The apparatus set forth in claim 1 wherein said message control processor compares first cell ID data of said first cell information message and second cell ID data of said second cell information message, and, if said second cell ID data is different than said first cell ID data, said message control processor stops processing said first cell information message and begins processing said second cell information message.

8. A wireless network comprising:
a plurality of base stations capable of communicating with a plurality of mobile devices; and
a message control processor for establishing a call connection between a first one of said plurality of mobile devices and one of said plurality of base stations, said message control processor capable of receiving from said plurality of base stations cell information messages generated by said first mobile station, each of said cell information messages comprising cell identification (ID) data identifying ones of said plurality of base stations from which said first mobile station is receiving wireless messages, wherein said message control processor, in response to receipt of a first cell information message from a first base station and receipt of a subsequent second cell information message from a second base station, compares the cell ID data within said first and second cell information messages, selectively processes only one of said first and second cell information messages based on the comparison of the cell ID data within said first and second cell information messages and transmits to only one of said first and second base stations a resource allocation message capable of establishing said call connection with said first mobile station.

9. The wireless network set forth in claim 8 wherein said message control processor is disposed in a mobile switching center of said wireless network.

10. The wireless network set forth in claim 8 wherein said message control processor compares first cell ID data of said first cell information message and second cell ID data of said second cell information message, and if said second cell ID data is the same as said first cell ID data, said message control processor processes said first cell information message and transmits said resource allocation message to said first base station.

11. The wireless network set forth in claim 8 wherein said message control processor compares first cell ID data of said first cell information message and second cell ID data of said second cell information message, and if said second cell ID data is different than said first cell ID data, said message control processor processes said second cell information message and transmits said resource allocation message to said second base station.

12. The wireless network set forth in claim 8 further comprising a timer associated with said message control processor capable of measuring a time period, T, after receipt of said first cell information message, wherein said message control processor processes only said first cell information messages and transmits said resource allocation message only to said first base station if said second cell information message is received after said time period, T, expires.

13. The wireless network set forth in claim 8 wherein said message control processor compares first cell ID data of said first cell information message and second cell ID data of said second cell information message, and, if said second cell ID data is the same as said first cell ID data, said message control processor continues processing said first cell information message and ignores said second cell information message.

14. The wireless network set forth in claim 8 wherein said message control processor compares first cell ID data of said first cell information message and second cell ID data of said second cell information message, and, if said second cell ID data is different than said first cell ID data, said message control processor stops processing said first cell information message and begins processing said second cell information message.

15. The wireless network set forth in claim 8 further comprising a memory coupled to said message control processor capable of storing said cell information messages.

16. For use in a wireless network comprising a plurality of base stations capable of communicating with a plurality of mobile devices, a method of establishing a call connection between a first one of the plurality of mobile devices and one of the plurality of base stations, the method comprising the steps of:
receiving from a first base station a first cell information message generated by the first mobile station, the cell information message comprising first cell identification (ID) data identifying ones of the plurality of base stations from which the first mobile station is receiving wireless messages;
after receipt of the first cell information message, receiving from a second base station a second cell information message generated by the first mobile station, the second cell information message comprising second cell identification (ID) data identifying ones of the plurality of base stations from which the first mobile station is receiving wireless messages;

comparing the first cell ID data and the second cell ID data; and processing only one of the first and second cell information messages based on the comparison of the first and second cell ID data and transmitting to only one of the first and second base stations a resource allocation message capable of establishing the call connection with the first mobile station.

17. The method set forth in claim 16 comprising the further step of, if the second cell ID data is the same as the first cell ID data, processing the first cell information message and transmitting the resource allocation message to the first base station.

18. The method set forth in claim 16 comprising the further steps of, if the second cell ID data is different than the first cell ID data, processing the second cell information message and transmitting the resource allocation message to the second base station.

19. The method set forth in claim 16 comprising the further steps of, if the second cell ID data is the same as the first cell ID data, continuing to process the first cell information message and ignoring the second cell information message.

20. The method set forth in claim 16 comprising the further steps of, if the second cell ID data is the different than the first cell ID data, ceasing processing of the first cell information message and beginning to process the second cell information message.

* * * * *